United States Patent [19]

Schenk

[11] 3,816,009
[45] June 11, 1974

[54] LATCH FASTENER
[75] Inventor: Peter Schenk, West Islip, N.Y.
[73] Assignee: Dzus Fastener Co., Inc., West Islip, N.Y.
[22] Filed: May 1, 1972
[21] Appl. No.: 249,170

[52] U.S. Cl.................. 403/108, 403/325, 403/379
[51] Int. Cl............................................. F16b 7/14
[58] Field of Search ........... 403/108, 324, 322, 325, 403/379, 330, 107, 321, 328; 105/367, 369 B; 108/54, 55; 248/408, 409, 423, 354 P; 292/278; 220/22.2, 22.3, 22.4, 84

[56]     References Cited
        UNITED STATES PATENTS
2,155,738  4/1939  Rydquist............................ 403/328
2,976,824  3/1961  Johnston........................ 105/369 B Primary Examiner—Andrew V. Kundrat
Attorney, Agent, or Firm—Kane, Dalsimier, Kane, Sullivan and Kurucz

[57] ABSTRACT

An adjustable latch fastener adapted to be mounted on a telescopic arrangement of members with openings therein to fix the relative position of said members. The fastener includes a latch bracket which has a base portion and a gripping portion. A bolt assembly is connected to the latch bracket in a manner which permits movement of the bracket to a predetermined degree rotationally, longitudinally and pivotally with respect to its point of attachment. The bolt assembly includes a stud and a receptacle member with one of the stud and receptacle members having a spiral cam surface thereon and the other of the stud and receptacle member having a projection mounted thereon so that when the stud and receptacle member are rotated with respect to one another to a predetermined degree, assembly and disassembly of the bolt assembly will occur. In this manner, the latch fastener is adapted to be quickly and efficiently mounted to and removed from the telescopic arrangement of members. An index pin is mounted on the bracket for insertion into a pair of aligned openings in the members so that the fastener may be shifted to permit the members to be altered to a different telescopic position wherein they may be re-engaged with a new set of aligned holes.

9 Claims, 5 Drawing Figures

PATENTED JUN 11 1974 3,816,009

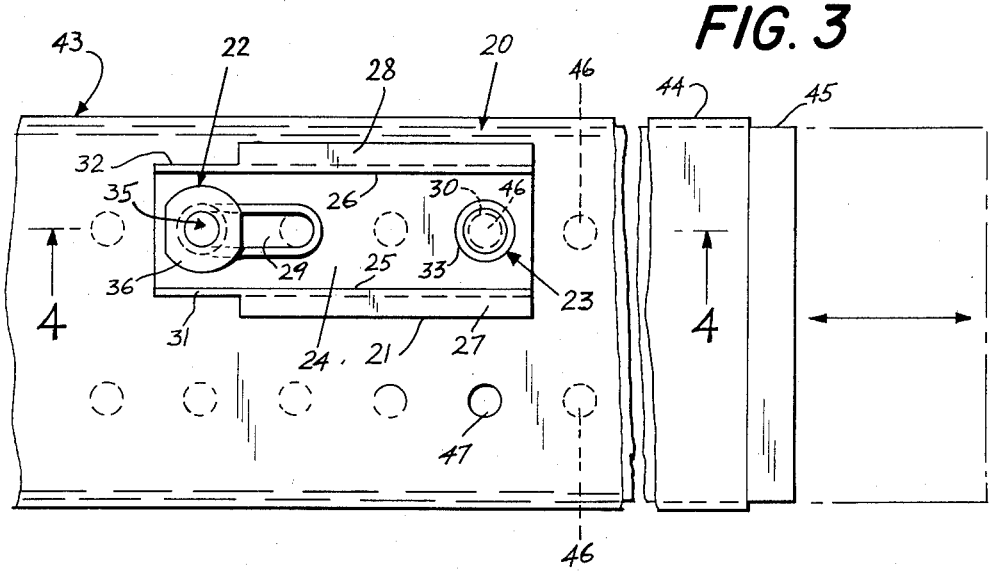

LATCH FASTENER

BACKGROUND OF THE INVENTION

With respect to component parts or assembled units, often large rigid containers are employed of predetermined dimensions to facilitate packing of the parts in a prearranged manner. For example, this is true in the automobile industry where component parts such as fenders are shipped in large volumes in heavy cast iron containers where the interior dimensions of the container are designed to receive a predetermined number of elements for shipment. Naturally, it is desirable that damage be minimized and therefore movement of the parts in the container be held to a minimum during shipment. Additionally, when the containers are shipped by freight car, it is often necessary to be assured that the containers will not shift within the freight car during coupling of the individual cars or actual movement of the train.

Furthermore, in shipment, it is desirable to provide the greatest number of containers within a given shipping area such as the interior of a freight car. As a result, it is desirable that maximum area be utilized and that the containers be flexible enough in exterior dimensions to facilitate their proper arrangement within an environment such as a freight car.

Consequently, containers have been designed which are substantially rigid in their entirety with the exception of a pair of telescopic members at a vertically, intermediate point on the end walls. By adjusting the inner member with respect to the outer member, the outer dimension of the rectangular shaped container can be regulated. Presently known devices for fixing the relative arrangement between the telescopic members of the containers include a fastener which passes through a pair of aligned holes in each of the members to fix the relative position of the two members. Removal of the fastener will permit the sliding of the members with respect to one another until another pair of aligned holes is derived at which time the fastener is re-engaged with the members fixing the elements at their new dimensional position.

Unfortunately, known fasteners are of the type which must be assembled and disassembled from the telescopic arrangement of members in an inefficient and unwieldy manner. Naturally, this is undesirable in that the length of time required to assemble and disassemble the container including the fastener is directly related to the loading and unloading time. Therefore, a latch fastener which would be able to be quickly associated and disassociated with the telescopic arrangement of members so that assembly and disassembly of a container for use and for storage respectively can be quickly and efficiently carried out would be extremely advantageous.

SUMMARY OF THE INVENTION

Thus, with the above considerations in mind, it is among the primary objectives of the present invention to provide a latch fastener which is designed to be mounted on a container containing a number of telescopic members so as to retain the members in fixed adjustable position with the latch fastener being of the type which may be quickly and efficiently assembled to the container and disassembled therefrom as desired. The latch fastener is of low cost construction and can be efficiently utilized.

The latch fastener includes a latch bracket adapted to be mounted on the telescopic arrangement of members with the latch bracket having a gripping portion and a base portion. The base portion of the latch bracket has a slot in one end thereof and a hole in the other end thereof. A bolt assembly is adapted to pass through the slot in the latch bracket and an opening in the exterior member and engage with the base of the exterior member to fasten the latch bracket to the exterior member while permitting the latch bracket to reciprocate along the exterior member a distance defined by the slot. A spring is captured by the bolt assembly and the latch bracket and normally tends to retain the latch bracket in fixed position against the exterior member. The bolt assembly includes a stud having a body and a flanged head portion. The body extends through an opening in the exterior member and the slot in the latch bracket with the undersurface of the flanged head bearing against the undersurface of the exterior member. A receptacle member having a hollow cylindrical portion to receive the forward portion of the body of the stud therein is also part of the bolt assembly. One of the stud and the receptacle member has a projection thereon and the other of the stud and the receptacle member has a cam slot thereon positioned for engagement with the projection when the receptacle member is engaged with the stud. An index pin is mounted in the hole in the base and extends therethrough to normally pass through aligned openings in the telescopic arrangement of members so as to retain the latch bracket in fixed position with respect to the members and to retain the members in relative fixed position. The latch bracket is adapted to be shifted from the normal position by lifting the other end of the base away from contact with the exterior member and compressing the spring until the index pin is removed from extended position through the openings in the members thereby permitting the telescopic members to slide with respect to one another to an alternate position. Thereafter, the latch bracket is adapted to be moved both rotationally and longitudinally along the slot to bring the index pin into alignment with a desired set of openings in the members at the alternate position. Then, release of the latch bracket will permit the index pin to extend into the openings and the spring and bolt assembly to return to the normal position retaining the latch bracket in fixed position with respect to the members and fixing their alternate relative position.

With the above objectives, among others, in mind, reference is had to the attached drawings.

BRIEF DESCRIPTION OF THE DRAWINGS

In the drawings:

FIG. 3 is a fragmentary side elevation view of the latch fastener of the invention mounted on the telescopic arrangement of members of a container;

FIG. 4 is a sectional bottom view thereof taken along the plane of line 4—4 of FIG. 3; and FIG. 5 is a fragmentary side elevation view of the telescopic arrangement of members of the container adapted to receive the latch fastener of the invention with arrows showing the variety of fastening positions for the latch fastener.

DESCRIPTION OF THE PREFERRED EMBODIMENT

Figure 1:
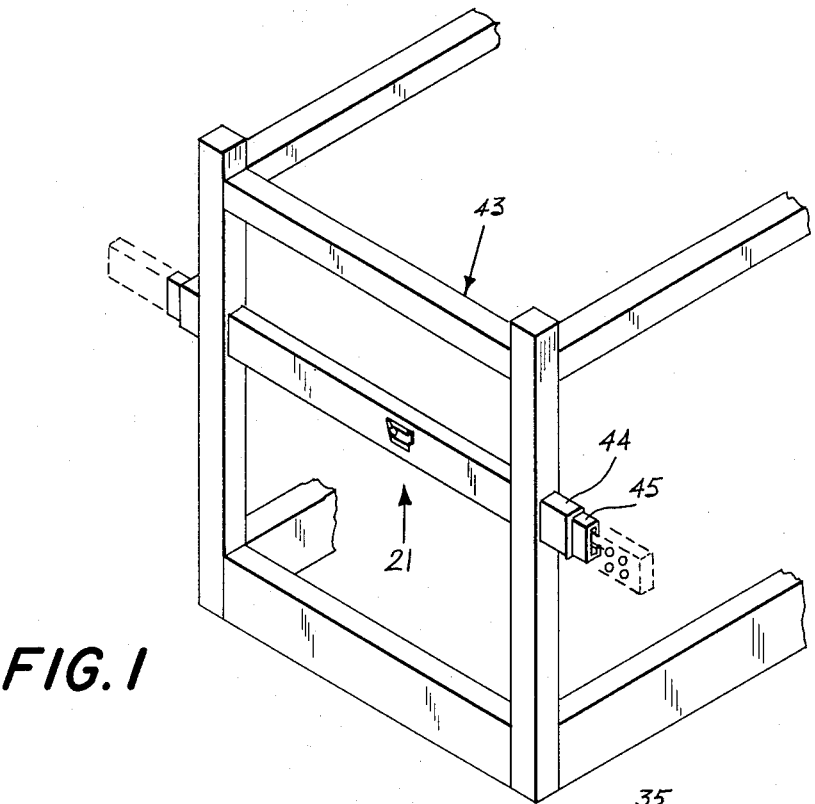
FIG. 1 is a perspective view of the latch fastener of the invention shown in position mounted on the telescopic arrangement of members of a container.
Figure 2:
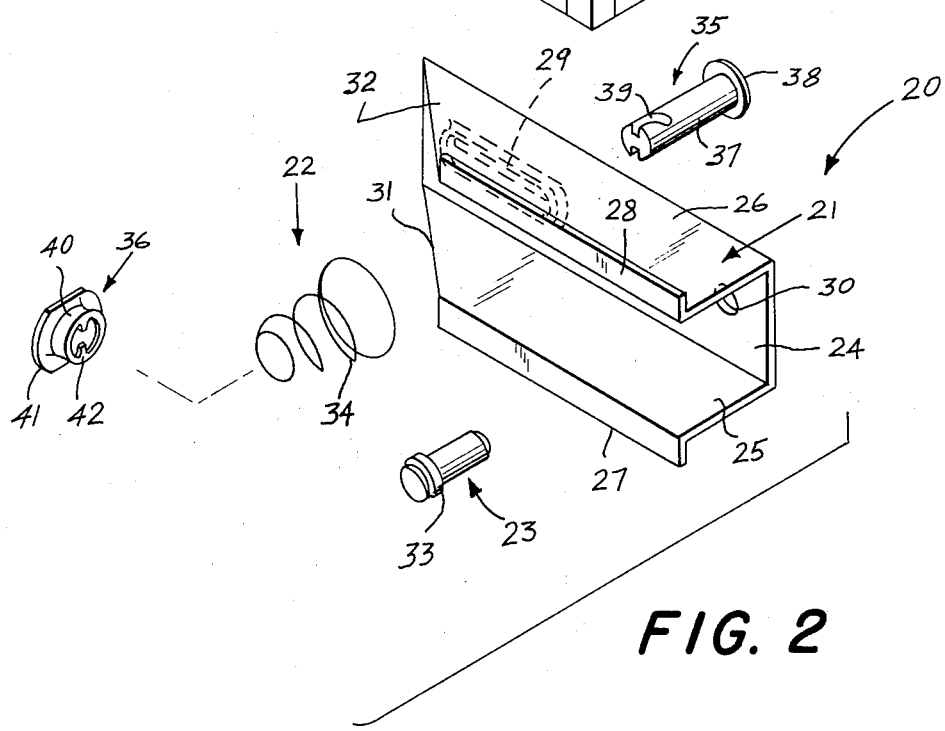
FIG. 2 is an enlarged exploded view of the latch fastener of the invention.

The latch fastener 20 includes a latch bracket 21, a bolt assembly 22 and an index pin 23. Latch bracket 21 includes a rectangular shaped base portion 24 and a pair of parallel side walls 25 and 26. The side walls 25 and 26 terminate in a pair of flanges 27 and 28 respectively. One end of base 24 contains a longitudinal slot 29 open on both sides of the base and the other end of the base has a hole 30 therein. The side walls 25 and 26 are beveled on their rear edges 31 and 32 respectively to facilitate access to slot 29 during operation of latch assembly 20.

Index pin 23 is a cylindrically shaped pin having a flange 33 adjacent its rear end to form a shoulder for engagement with base 24 when the forward portion of index pin 23 is extended through opening 30. Index pin 23 is fastened to base 24 in extended position through opening 30 in any conventional convenient manner.

Bolt assembly 22 includes a helical spring 34, a stud 35, and a receptacle 36. The body portion 37 of stud 35 is adapted to extend through slot 29 and through an opening in the member to which latch fastener 20 is to be attached as will be described in detail below. The rear end of stud 35 contains a flange or head 38 the undersurface of which engages with the member to which fastener 20 is attached in assembly. The forward end of stud 35 which extends through slot 29 contains a pair of diametrically opposed spiral cam slots 39. Helical spring 34 is of sufficient inner diameter to surround the body of receptacle 36 in a manner which will permit its movement freely in an axial direction with respect to stud 35. When helical spring 34 is positioned around the receptacle body one end is brought into engagement with the base 24 adjacent to slot 29.

Receptacle 36 includes a hollow receiving portion 40 terminating at its rear end in a flanged head 41. When bolt assembly 22 is assembled, the upper end of spring 34 engages with the undersurface of flanged head 41.

Receptacle 36 is made with a pair of diametrically opposed inner projections or tabs 42. Each tab 42 is positioned to engage with a corresponding cam slot 39 in stud 35. Thereafter, when receptacle 41 is rotated with respect to stud 35 tabs 42 will follow cam slots 39 into the fastened position and in doing so will place a compressive force on helical spring 34 captured between the undersurface of flanged head 41 and base 24.

FIGS. 1, 3 and 4, in particular, show latch fastener 20 mounted on a container 43. One type of container among many with which fastener 20 is adaptable to function is a heavy cast iron container for holding and transporting such items as automobile parts. Containers of that type are rigid in configuration and are designed to have a particular interior volume so that a predetermined arrangement and number of parts can be carried therein with the minimum danger of damage to the parts occurring during transporting procedures. Naturally, it is also desirable to utilize the maximum amount of volume within the container and thereby transport the greatest number of parts in any given container. In many instances, completed assemblies as well as component parts are transported in a rigid container of predetermined volume as is shown and depicted in regard to description of the embodiment of latch 20 at hand.

As discussed in detail above, it is often desirable to vary the exterior dimensions of container 43 depending upon loading conditions. This is facilitated by the provision of a pair of telescoping members 44 and 45 mounted on the end walls of container 43. As shown, the outer diameter of inner member 45 is less than the inner diameter of outer member 44 to permit member 45 to slide within member 44. Therefore, by extending inner member 45 in either direction, the lateral dimension of container 43 is altered. In this manner, as discussed above, member 45 can be extended into engagement with the wall of a freight car or an adjoining rigid container to assure that each container 43 is in fixed position minimizing the danger of damage during shipment.

Naturally, when member 45 has been extended with respect to member 44 to the desired position it is necessary to fix that position by means of a latch 20 which can be operated in a rapid and efficient manner as will be discussed in detail below.

Members 44 and 45 contain two rows of openings 46 and 47 which are in spaced position on members 44 and 45. The openings in row 46 of each member are vertically aligned with the corresponding row 46 in the other member. The same relationship is also true in regard to each row 47. Therefore, when member 45 is extended within outer member 44 the corresponding rows of openings 46 and 47 in each member are positioned so that by sliding member 45 with respect to member 44 an opening 46 may be brought into alignment with a corresponding opening 46 in the other member or an opening 47 can be brought into alignment with a corresponding opening 47 in the other member depending upon a predetermined increment of movement of member 45. By providing two rows of openings 46 and 47 it is possible to bring a pair of openings into alignment with only a small incremental sliding movement of member 45. This can be accomplished if desired by off-setting the opening in rows 46 and 47 of members 45 with respect to the corresponding openings in rows 46 and 47 of member 44. This permits small increments of movement of member 45 to bring different sets of openings in members 44 and 45 into alignment. As discussed above, with a rigid container this facilitates adjustment of the external walls of the container thereby enhances the versatility of the container and assures that it can be easily and efficiently tightly located in shipping position.

Latch fastener 20 is mounted on member 44 by extending stud 35 through an opening therein. Latch bracket 21 is then extended onto stud 35 which passes through slot 29. Index pin 23 passes through a pair of aligned openings in members 44 and 45. Helical spring 34 is then positioned around receptacle 36, mounted on the end of stud 35, and the receptacle is rotated so that tabs 42 follow cam slots 39 to the closed position. Simultaneously with the rotation of receptacle 36 a compressive force is placed on helical spring 34 so that bolt assembly 22 in combination with index pin 23 retains latch assembly 20 in fixed relationship with respect to members 44 and 45 and retains members 44 and 45 in fixed telescopic relation to one another.

The length of slots 39 are predetermined so that only approximately one quarter of a revolution of the stud with respect to the receptacle is required in order to shift the bolt assembly between the fastened and unfastened positions. In this manner, the latch fastener may be quickly and efficiently assembled and disassembled to the container so that time is saved and handling costs are reduced.

As depicted, there are two slots 39 and two tabs 42 in the assembly. Naturally, it is contemplated that other arrangements of tabs and slots may be employed such as in a one-to-one ratio, a three-to-three ratio or a four-to-four ratio.

To change the relationship of members 45 and thereby the exterior configuration of container 43, latch bracket 21 is grasped and pivoted upward and away from the engagement between its base 24 and the outer surface of member 44 at one end until index pin 23 is removed from the aligned openings in members 44 and 45. The resiliency of spring 34 permits it to accept the greater compressive force at the end where bolt assembly 22 is located when fastener 20 is pivoted at that point in order to facilitate the pivotal action. Slot 29 is also of assistance in permitting the pivoting of latch bracket 21 with respect to stud 35 and the entire bolt assembly 22. The beveled rear surfaces 31 and 32 of the side walls of latch bracket 21 are helpful in permitting access to bolt assembly 22 for assembly and disassembly thereof and also are helpful in permitting freedom of movement of latch bracket 21 about bolt assembly 22. This includes both the pivotal action of latch bracket 21 with respect to container 43 and also its ability to rotate about the pivot point in the proximity of bolt assembly 22. The length of slot 29 provides an additional dimensional movement for latch bracket 21. It permits the latch bracket to be shifted longitudinally and axially with respect to members 44 and 45. In this manner, latch bracket 21 and the index pin 23 mounted therein can be shifted rotationally and longitudinally once it has been pivoted away from members 44 and 45 thereby permitting the fastener 20 to be engaged with a number of different openings in each of the two rows of openings 46 and 47 of member 44. An example of possible different positions to which latch bracket 21 may be moved so that index pin 23 is brought into alignment with a different opening in member 44 is depicted in FIG. 5. Each of the arrows in that FIG. represents a different opening which can be reached by index pin 23 due to the freedom of movement of latch bracket 21. By off-setting the openings in member 45, only a slight sliding movement of member 45 with respect to member 44 will bring another opening into alignment with one of the four potential positions for index pin 23 shown in FIG. 5. It has been found that increments of movement in the area of one quarter inch have worked satisfactorily in the use of latch fastener 20 on the container 43. In this manner, the exterior dimensions of container 43 can be closely controlled.

When member 45 has been moved to the desired telescopic position, latch bracket 21 is shifted to the one alternative opening in member 44 which is in alignment with an opening in member 45 so that index pin 23 will extend through the aligned openings in members 44 and 45 when the latch bracket 21 is released. Spring 34 under compression will return to its normal slightly compressed configuration as shown in FIG. 4 and will maintain index pin 23 within the aligned openings in members 44 and 45 and the base 24 of latch bracket 21 in engagement with the outer surface of member 44. Thus, the latch fastener 20 is quickly and efficiently operated to change the relative fixed position of members 44 and 45 to one another and to alter an exterior dimension of container 43.

Thus, the above discussed objectives of the invention, among others, are effectively attained.

I claim:

1. An adjustable latch fastener adapted to be mounted on telescoping members each with spaced aligned openings therein to fix the relative position of said members comprising:

a latch bracket adapted to be mounted on the members;

the latch bracket having a gripping portion and a base portion;

the base portion of the latch bracket having an elongated slot in one end thereof and a hole in the other end thereof;

a bolt assembly adapted to pass through the slot in the latch bracket and an opening in the base of the exterior one of said telescoping members and removably engaged with the base of the exterior member to fasten the latch bracket to the exterior member while permitting the latch bracket to reciprocate along said exterior member a distance defined by the slot;

a spring around the bolt assembly and within the latch bracket and normally tending to retain the latch bracket in fixed position against the exterior member;

said bolt assembly including a stud having a body and a flanged head portion with the body extending through said opening in the base of the exterior member and the slot in the latch bracket with the undersurface of the flanged head bearing against the undersurface of the exterior member, and a receptacle member having a hollow cylindrical portion to receive the forward portion of the body of the stud therein, and one of the stud and the hollow cylindrical portion having a spiral cam surface thereon and the other of the stud and the hollow cylindrical portion having a projection thereon for interengagement with the cam surface to readily facilitate the assembly and disassembly of said latch fastener with respect to said telescopic arrangement of members;

an index pin mounted in the hole in the base and extended therethrough to normally pass through said spaced aligned openings in the telescoping members so as to retain the latch bracket in fixed position with respect to the members and to retain the members in relative fixed position; and said latch bracket adapted to be shifted from the normal position by lifting the other end of the base away from contact with the exterior member and compressing the spring until the index pin is removed from extended position through the openings in the members thereby permitting the telescoping members to slide with respect to one another to an alternate position, and thereafter the latch bracket being adapted to be moved both rotationally and longitudinally along the slot to bring the index pin into alignment with a desired set of openings in the members in the alternate position whereby release of the latch bracket will permit the index pin to extend into the openings and said spring and bolt assembly to return to the normal position retaining the latch bracket in fixed position with respect to said telescopic arrangement of members and fixing the alternate relative position of said members.

2. The invention in accordance with claim 1 wherein the forward end portion of the body of the stud has a spiral cam surface thereon and the projection is mounted in the hollow cylindrical portion to engage with the cam slot in the stud.

3. The invention in accordance with claim 2 wherein there are two diametrically opposed projections mounted in the hollow cylindrical portion and two corresponding diametrically opposed spiral cam surfaces on the body of the stud positioned so that each projection engages with a corresponding spiral cam surface.

4. The invention in accordance with claim 1 wherein one quarter of a revolution in one direction is sufficient to completely engage the stud and the receptacle member and one quarter of a revolution in the opposite direction is required to completely disengage the receptacle member from the stud.

5. The invention in accordance with claim 1 wherein the rear end portion of the receptacle contains an annular shoulder, the spring being a helical spring with one end bearing against the base of the latch bracket and the other end bearing against the undersurface of the annular shoulder on the receptacle of the bolt assembly so that when the bolt assembly is rotated to position the projection fully in the cam surface the spring will be compressed to thereby tend to retain the latch bracket and index pin in fixed engagement with the members and the members in relative fixed position.

6. The invention in accordance with claim 1 wherein the latch fastener is adapted to be mounted on a telescopic arrangement of two members with one member being slidable within the other, each member having two parallel rows of aligned openings extending longitudinally along said members with the latch fastener being shiftable into a position whereby the index pin is aligned with aligned openings in either row depending upon the relative position of the telescopic members.

7. The invention in accordance with claim 1 wherein the latch bracket includes a rectangular shaped base portion containing the slot and the hole therein and a pair of perpendicular extending side walls in substantial parallel relation to form gripping surfaces for facilitating the arrangement of the latch bracket with respect to the telescopic arrangement of members.

8. The invention in accordance with claim 1 wherein the index pin includes a cylindrical body portion for extension through the hole in the latch bracket and a pair of aligned openings in the members and a flanged head portion for engagement with the surface of the base of the latch bracket distal from the exterior member so that only the body portion extends through the hole therein.

9. The invention in accordance with claim 1 wherein the openings in said members are arranged in respect to the latch bracket so that the members may be telescopically shifted in small increments of distance with respect to one another.

* * * * *